(No Model.)

A. W. LOCKHART.
THRASHING AND CLOVER HULLING MACHINE.

No. 285,422. Patented Sept. 25, 1883.

WITNESSES
Jas. E. Hutchinson.
S. G. Nottingham.

INVENTOR
A. W. Lockhart.
B. H. A. Symon
Attorney

UNITED STATES PATENT OFFICE.

ALEXANDER W. LOCKHART, OF SACRAMENTO, CALIFORNIA.

THRASHING AND CLOVER-HULLING MACHINE.

SPECIFICATION forming part of Letters Patent No. 285,422, dated September 25, 1883.

Application filed January 23, 1883. (No model.)

*To all whom it may concern:*

Be it known that I, ALEXANDER W. LOCKHART, of Sacramento, in the county of Sacramento and State of California, have invented certain new and useful Improvements in Thrashing and Clover-Hulling Machines; and I do hereby declare the following to be a full, clear, and exact description of the invention, such as will enable others skilled in the art to which it pertains to make and use the same.

My invention relates to an improvement in thrashing and clover-hulling machines, the object of the same being to provide one or a series of yielding leaves placed side by side in a continuous row in front of the concave, so as to enable any foreign substances—such as stones, parts of machinery, &c.—to be forced out of the machine by the action of the cylinder-teeth before it reaches the concave proper; and with these ends in view my invention consists in the combinations of parts, which will be more fully described, and pointed out in the claims.

Figure 1:
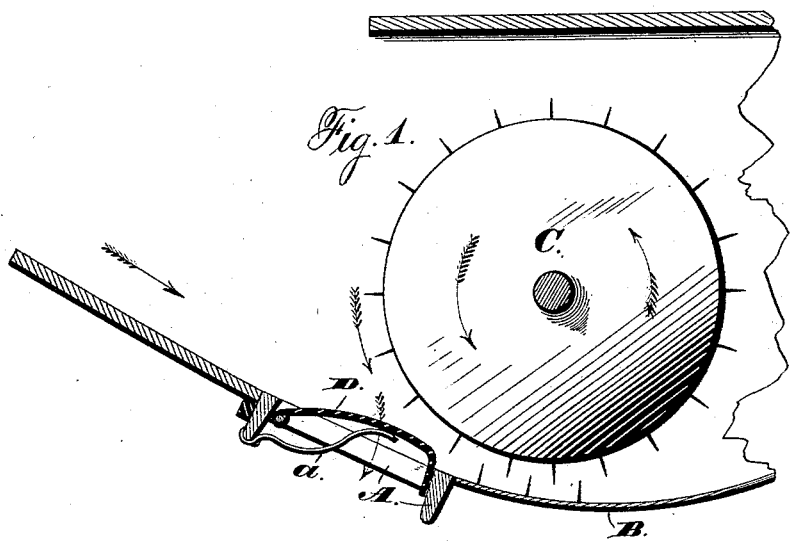
Figure 2:
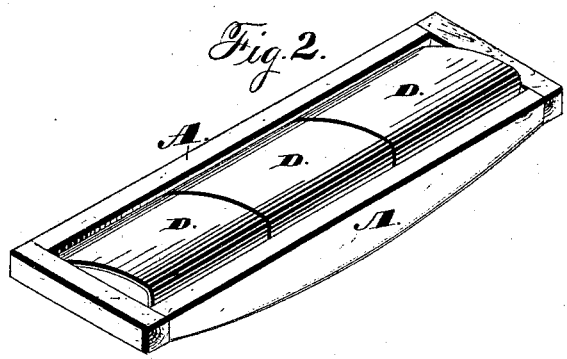
Figure 3:
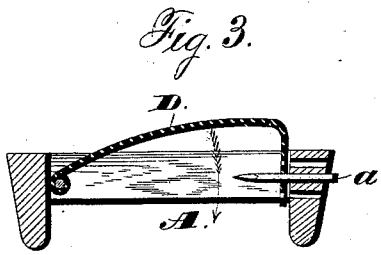

In the accompanying drawings, Figure 1 is a view in longitudinal section of a portion of a thrashing-machine, showing one form of my improvement applied thereto. Fig. 2 is a perspective view of the hinged leaves and supporting-frame, and Fig. 3 shows the leaves supported by pins.

A represents a rectangular frame constructed and adapted to fit within a thrashing or clover-hulling machine in front of the concave B, and under or partly under the cylinder C. This frame can be formed integral with or separate from the machine-frame, as desired, and is provided with one or a series of hinged metallic or other suitable leaves, D, placed in a row therein, and held in position by springs *a*, or by wooden or other pins. The leaves can be straight; but I prefer to make them curved or slightly convexed, as shown in the drawings, so as to enable their lower ends or edges to rest up above the bars of the concave when they are lowered and in close proximity to the teeth of the cylinder. The leaves D are preferably made between eight and twelve inches wide, and of any desired length, and each may be hinged at its front or outer end to the frame A, or directly to the feed-board of the machine, as desired, or may be held up entirely by pins without the use of hinges.

I prefer to use springs for supporting the leaves, as they automatically right the leaves when pressure is removed therefrom. The wooden pins before referred to are adapted to be broken and release the leaf or leaves whenever a foreign substance is encountered, and thereby enabling the foreign substance to escape before reaching the concave. This construction requires constant attention, as the leaves have to be righted before they can perform their functions; but where the springs are employed they yield sufficiently to enable all foreign matter to escape and automatically right themselves after it has escaped. When wooden pins are employed, the leaves D are provided with the depending flanges *c*, through which the said pins pass, and by providing the said flange with a series of holes, or the frame of the machine with a series of holes, the leaves can be vertically adjusted to suit circumstances.

It very often happens, when grain, especially in a loose state, is fed to a thrashing-machine, that parts of machinery, hammers, chisels, sticks, or stones often get accidentally mixed therewith and are fed into the thrasher, and very often injure the machine by destroying either the concave or cylinder; but by the use of the hinged leaves before described this danger is obviated. All the grain, together with the foreign substances mixed therewith, pass from the feed-board of the machine onto the hinged leaves, which latter are situated in front of the concave and under or partly under the cylinder. The lower edges of these leaves rest in close proximity to the teeth of the cylinder, and prevent any foreign substances large enough to injure the parts from passing through without first being struck by the teeth of the cylinder. As soon as the teeth of the cylinder strike the foreign substance the hinged leaf or leaves yield and allow it to fall through, and where springs are employed automatically right themselves after the obstruction has passed out.

My invention is simple in construction, durable and effective in use, and is adapted to be applied to a great variety of thrashing and other machines as now constructed.

I am aware that clover-hulling and thrashing machines have been provided with a single yielding section, to allow of the escape of foreign material; but such construction allows of the escape of considerable grain, as the single yielding section when opened forms an escape not only for the foreign material, but provides an escape-opening the entire width of the concave, through which the grain may escape. By subdividing the yielding section into a number of independently-yielding sections an opening is formed only at that point where the foreign material enters the machine, the remaining sections remaining closed and preventing the escape of the grain. The pins employed to support the sections are of yielding or frangible material.

Having fully described my invention, what I claim as new, and desire to secure by Letters Patent, is—

1. The combination, with a concave and cylinder, of a series of leaves placed in front of the concave and under or partly under the cylinder, and devices connected with each leaf for supporting it and allowing the leaves of the series to yield independently of each other, to allow of the escape of foreign material, substantially as set forth.

2. The combination, with a cylinder and concave, of a rectangular frame, curved metallic leaves hinged to the frame, and pins of yielding or frangible material for supporting each leaf in close proximity to the teeth of the cylinder, substantially as set forth.

In testimony whereof I have signed this specification in the presence of two subscribing witnesses.

ALEXANDER WASHINGTON LOCKHART.

Witnesses:
JOHN H. COPPERSMITH,
C. ZIMMERMAN.